United States Patent [19]

Kamimura et al.

[11] Patent Number: 5,475,667
[45] Date of Patent: Dec. 12, 1995

[54] METHOD FOR INSPECTING AN OPTICAL DISC

[75] Inventors: Kenji Kamimura; Shinichi Hanzawa, both of Yamanashi, Japan

[73] Assignees: Pioneer Electronic Corporation, Tokyo; Pioneer Video Corporation, Yamanashi, both of Japan

[21] Appl. No.: 331,198

[22] Filed: Oct. 28, 1994

[30] Foreign Application Priority Data

Nov. 1, 1993 [JP] Japan .................. 5-273368

[51] Int. Cl.⁶ .................................................. G11B 7/00
[52] U.S. Cl. .................. 369/54; 369/58; 369/44.32
[58] Field of Search ................ 369/44.32, 44.25, 369/44.11, 44.14, 112, 44.21, 44.22, 44.17, 119, 54, 47, 124, 58; 250/201.5

[56] References Cited

U.S. PATENT DOCUMENTS

| 4,634,853 | 1/1987 | Kanamaru | 369/44.32 |
| 4,780,865 | 10/1988 | Yamakawa | 369/44.32 |
| 5,151,890 | 9/1992 | Yonekubo | 369/44.14 X |
| 5,386,404 | 1/1995 | Koyama | 369/44.32 |
| 5,420,840 | 5/1995 | Bec | 369/44.17 X |

Primary Examiner—Aristotelis Psitos
Assistant Examiner—Thang V. Tran
Attorney, Agent, or Firm—Sughrue, Mion, Zinn, Macpeak & Seas

[57] ABSTRACT

An optical pickup for emitting a laser beam is provided for reading data recorded on an optical disc. The axis of the laser beam is tilted at a skew angle from a perpendicular line to the surface of the disc. Error rate in reproduced data read out by the pickup is determined, and an inferior disc having a rare error rate is eliminated.

2 Claims, 3 Drawing Sheets

METHOD FOR INSPECTING AN OPTICAL DISC

BACKGROUND OF THE INVENTION

The present invention relates to a method for inspecting the quality of an optical disc on which data are recorded together with error detection and correction marks for detection errors and for correction thereof.

The quality of an optical digital disc such as a compact disc has been checked by detecting a block error rate (BLER) dependent on the error detection marks, that is the occurence rate of errors in a block of a disc within a set time.

Referring to FIG. 4, an optical pickup 2 for reading data and detecting the BLER of an optical disc 1 has a semiconductor laser diode 3 which emits a laser beam L perpendicular to the surface of the disc 1. The laser beam L is focused on the recording surface of the disc 1 through a beam splitter 4 and an objective 5. The beam reflected on the optical disc 1 passes through the objective 5 and the beam splitter 4 and is received by a photodetector 6.

Errors in each block of the disc included in the reproduced data from the photodetector 6 are counted. When the added error count per time unit is under a predetermined threshold value, the disc is determined as an appropriate product. On the other hand, when the added error count is larger than the threshold value, the disc is determined as an inferior product.

In addition, the disc may further have a warp as shown in FIG. 5. When there is such a warp, the BLER increases.

FIG. 6 is a graph showing a relationship between the BLER and a skew angle θ (FIG. 5) which is an angle between the axis of the laser beam L and a perpendicular of the surface of the disc. In the case of a disc a, if the skew angle increases, the BLER does not rapidly rise. On the other hand, the BLER of a disc b largely increases with the increase of the skew angle. However disc b passes the conventional inspection as long as the BLER remains under a threshold value TV at a certain detecting point of the disc.

A high density disc has a small track pitch, and hence small pits. Such a high density disc must be reproduced using a laser beam which forms a small beam spot on the surface thereof. Namely, the wavelength of the laser beam must be short and the aperture number of the objective must be increased. As a result, the depth of focus is decreased. Thus, it is impossible to accurately read from and write on a disc such as the disc b, where the width between the line showing the characteristics of the BLER is small. Namely, a range of the permissible skew angles, hereinafter referred to as a skew margin, is too small for the high density disc. Therefore, it is necessary to eliminate such a disc at the inspection.

SUMMARY OF THE INVENTION

An object of the present invention is to provide an inspection method for the optical discs wherein a disc having a small skew margin can be detected.

According to the present invention, there is provided a method for inspecting an optical disc, comprising a spindle motor for rotating the optical disc, an optical pickup for emitting a laser beam for reading data recorded on the disc, the axis of the laser beam being tilted at a skew angle from a perpendicular line to the surface of the disc, detector means for detecting errors in reproduced data read out by the pickup, and determining means for determining an inferior disc based on the detected errors.

The detector means is provided for detecting error rate in a block of the disc within a time.

The other objects and features of this invention will become understood from the following description with reference to the accompanying drawings.

DETAILED DESCRIPTION OF THE PREFERRED EMBODIMENTS

Figure 1:
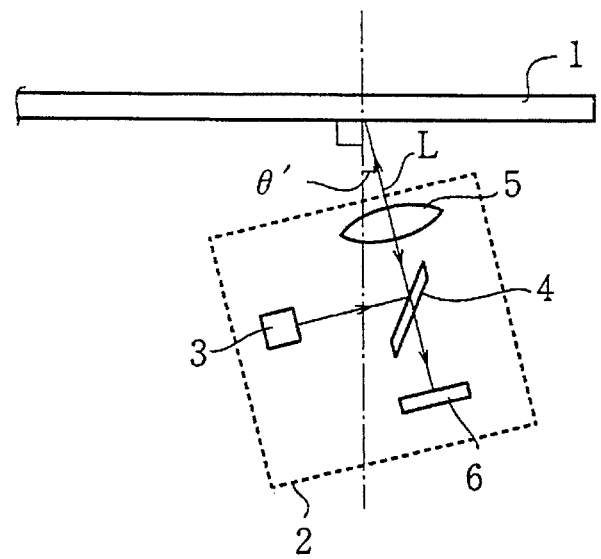
FIG. 1 is a schematic diagram of an optical pickup for a disc inspection system according to the present invention.
Figure 4:
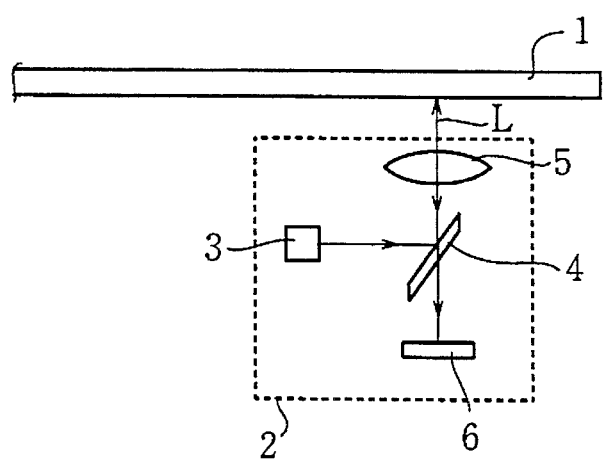
FIG. 4 is a schematic diagram showing a pickup in a conventional disc inspection method.
Figure 5:
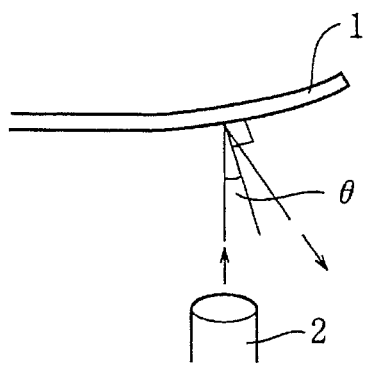
FIG. 5 is an illustration explaining the skew angle of a laser beam.
Figure 6:
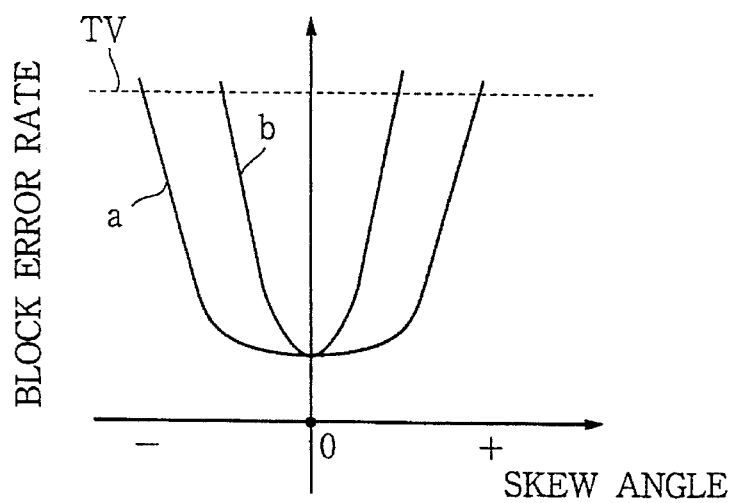
FIG. 6 is a graph showing a relationship between the skew angle and the block error rate in the conventional disc inspection method.

FIG. 1 shows an optical pickup of a disc inspection system according to the present invention. The same numerals as those in FIG. 4 designate the same parts in FIG. 1.

Referring to FIG. 1, the pickup 2 is adjusted to emit the laser beam L, the axis of which is tilted an appropriate skew angle θ' from the perpendicular, thereby providing an effect as though the disc 1 is warped. The laser beam emitted from the semiconductor laser diode 3 is bent by the beam splitter 4 and focused on the recording surface of the disc 1 through the objective 5. The beam reflected from the disc 1 is applied to the photodetector 6.

On the disc 1, data for digital signals such as digital audio signals and/or digital video signals are recorded together with the error detection and correction marks at every block.

Figure 2:
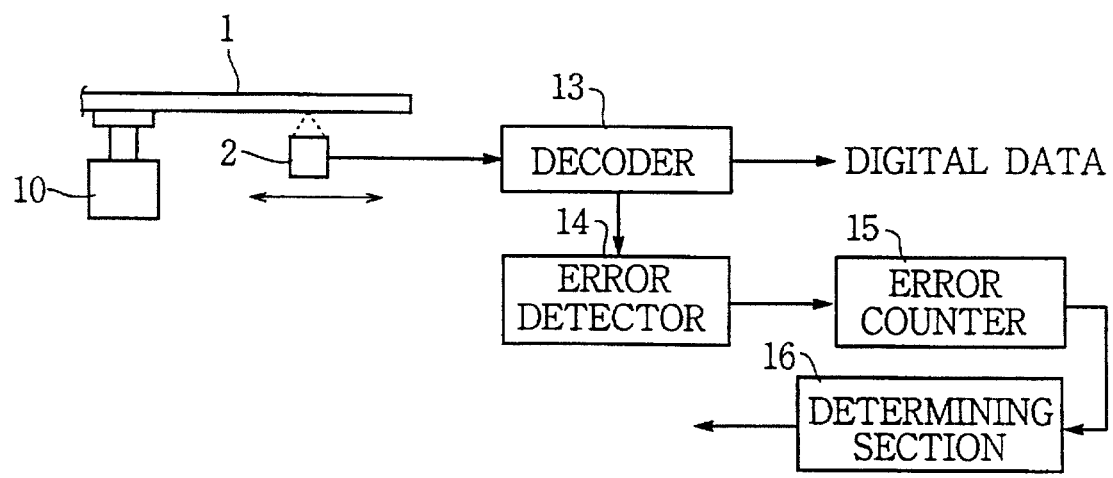
FIG. 2 is a block diagram showing the disc inspection system.

Referring to FIG. 2, the disc 1 is rotated at a predetermined speed by a spindle motor 10 in operation. The reproduced signal read out by the pickup 2 is fed to a decoder 13 so as to be converted into a decoded digital data. The digital data is also fed to an error detector 14 wherein errors in each data block of the disc 1 are detected dependent on the error detection and correction marks. The number of errors are counted up by an error counter 15. When the number of errors per time unit (block error rate) is lower than a predetermined threshold value TV, a determining section 16 decides that the disc has enough skew margin. On the other hand, when the number of errors exceeds the threshold value, the determining section 16 determines that the skew margin of the disc is too narrow for use.

Thus, in the present invention, the laser beam emitted detects the disc at the skew angle θ'. Namely, a disc having a large BLER at the skew angle θ' is eliminated.

Figure 3:
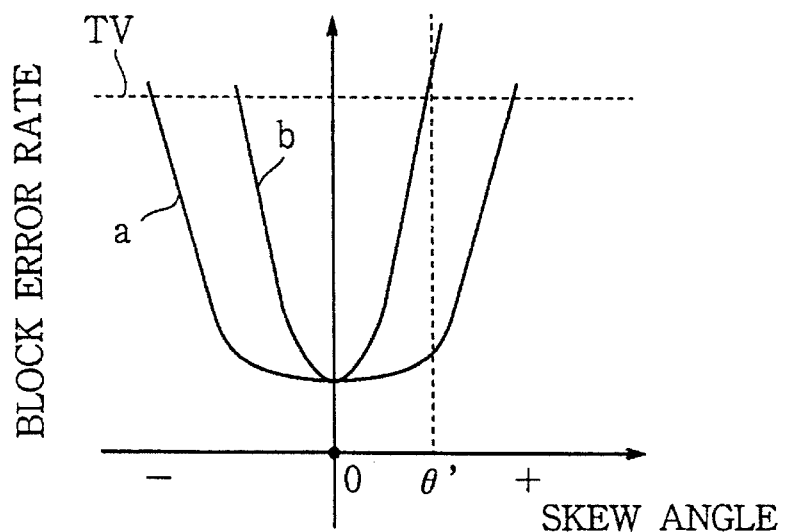
FIG. 3 is a graph showing a relationship between the skew angle and the block error rate in a disc inspection method of the present invention.

As shown in FIG. 3, the BLER of the disc a at the skew angle θ' is lower than the threshold value TV so that the disc passes the inspection. To the contrary, the BLER of the disc b at the skew angle exceeds the threshold value TV. Therefore, the disc b does not pass the inspection. Hence by emitting the laser beam at an appropriate skew angle, a disc having a small skew margin can be detected.

From the foregoing it will be understood that the present invention provides a method for inspecting an optical disc wherein the disc having a small skew margin can be accurately detected at the same time as the detection of the block error rate. Therefore, the discs that passed the inspection can be used as a high density disc.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An apparatus for inspecting an optical disc on which digital data are recorded together with error detection and correction marks at every block, comprising:

a spindle motor for rotating the optical disc;

an optical pickup for emitting a laser beam for reading data recorded on the disc;

the axis of the laser beam being tilted at a skew angle from a perpendicular line to the surface of the disc;

detector means for detecting errors in reproduced data read out by the pickup in dependence on the error detection and correction marks; and determining means for determining an inferior disc based on the detected errors.

2. The apparatus according to claim 1 wherein the detector means is provided for detecting error rate in a block of the disc within a time.

* * * * *